United States Patent [19]
Yokobayashi

[11] Patent Number: 5,124,110
[45] Date of Patent: Jun. 23, 1992

[54] TEMPERATURE ADJUSTING AND COMPRESSING IN INJECTION STRETCH BLOW MOLDING FOR FORMING RAISED PORTIONS IN THE CONTAINER PRODUCED

[75] Inventor: Kazuyuki Yokobayashi, Ueda, Japan

[73] Assignee: Nissei ASB Machine Co., Ltd., Nagano, Japan

[21] Appl. No.: 553,658

[22] Filed: Jul. 18, 1990

[30] Foreign Application Priority Data

Jul. 20, 1989 [JP] Japan ................... 1-188543

[51] Int. Cl.$^5$ .................. B29C 49/06; B29C 49/64
[52] U.S. Cl. ..................... 264/520; 264/521; 264/531; 264/538; 264/DIG. 33; 264/DIG. 65; 425/525; 425/526; 425/528
[58] Field of Search ............ 264/520, 521, 531, 532, 264/DIG. 33, 25, 322, 538, DIG. 65; 425/526, 528, 525

[56] References Cited

U.S. PATENT DOCUMENTS

| | | |
|---|---|---|
| H,671 | 9/1989 | Cho et al. |
| 2,985,915 | 5/1961 | Winstead ............ 264/DIG. 33 |
| 3,125,619 | 3/1967 | Miller ............... 264/DIG. 33 |
| 4,151,249 | 4/1979 | Lee .................... 264/520 |
| 4,320,083 | 3/1982 | Jakobsen ............. 264/521 |
| 4,880,593 | 11/1989 | Strassheimer ......... 264/532 |

FOREIGN PATENT DOCUMENTS

| | | | |
|---|---|---|---|
| 88491 | 9/1983 | European Pat. Off. | ........... 264/520 |
| 55-79238 | 6/1980 | Japan . | |
| 60-73830 | 4/1985 | Japan | .................. 264/520 |

Primary Examiner—Jan H. Silbaugh
Assistant Examiner—Catherine Timm
Attorney, Agent, or Firm—Oliff & Berridge

[57] ABSTRACT

A process for forming a hollow container from a hot closed-end parison includes the steps of injection molding a hot closed-end parison, adjusting the temperature of the hot closed-end parison by heating or cooling the hot closed-end parison in a predetermined location within a temperature adjusting pot in a temperature adjusting device. The parison is then blow-molded into a hollow container having a predetermined configuration after the parison has been adjusted in temperature. The temperature adjusting step uses at least either of the temperature adjusting pot or a temperature adjusting core in the temperature adjusting device so as to apply a pre-treatment, such as by clamping, to a portion of said hot closed-end parison for obtaining a predetermined concavo-convex pattern in the hollow container formed at the subsequent blowing step. Thus, a hollow container, a portion of which has the desired concavo-convex pattern, can be mass-produced simply and inexpensively.

11 Claims, 6 Drawing Sheets

TEMPERATURE ADJUSTING AND COMPRESSING IN INJECTION STRETCH BLOW MOLDING FOR FORMING RAISED PORTIONS IN THE CONTAINER PRODUCED

BACKGROUND OF THE INVENTION

1. Field of the Invention

The present invention relates to a process of blowing hollow containers such as bottles or the like from closed-end parisons and particularly to an injection/stretch/blow molding process for forming a predetermined concavo-convex pattern in the bottom of a hollow container.

2. Description of the Related Art

There are well-known injection/stretch/blow molding techniques which are utilized to blow hollow containers such as bottles from synthetic resin materials such as polyethylene terephthalate (PET). The hollow containers thus blown are transparent with surface gloss as in glass bottles and superior in various properties such as resistance to shock, air blocking, handling for design, mass-productivity and so on. For such reasons, the hollow blown containers are currently used for various fluid materials such as cold drinks, powdered detergents and the like.

However, such hollow blown containers are easily deformable since the wall thickness thereof is small. For example, if they are used as pressurized liquid containers for carbonated beverages and beers, the walls and particularly the base portions in the containers are easily deformable due to the internal pressure from the contents thereof. The base portions of the hollow blown containers are required to be strengthened sufficiently to resist the internal pressure described as well as drop test.

In order to overcome such problems, it has been proposed that the bottoms of the hollow blown containers were formed with concavo-convex patterns and particularly strengthening ribs, as in Japanese Laid-Open Patent Application 79238/1980.

This proposal uses a core utilized to injection mold a parison and having a concavo-convex pattern formed therein. The core is used so as to provide a closed-end parison having its bottom in which strengthening ribs are formed by the concavo-convex pattern during molding.

However, this proposal can be applied only to the so-called cold parison technique, but not to the hot parison technique in which immediately after a parison has been injection molded, it is blown utilizing its potential heat.

In other words, the injection/stretch/blow molding technique for blow molding hollow containers from closed-end parisons frequently utilizes the hot parison technique for blow molding hollow containers by the use of potential head in parisons immediately after they have been injection molded.

In the hot parison technique, the distribution of temperature in the hot closed-end parison highly influences the wall thickness of a hollow container to be blown.

It is thus required to injection mold a hot closed-end parison without creation of irregularity in temperature.

The injection molding of the closed-end parison is accomplished by injecting a synthetic resin material such as PET into a small mold cavity which is surrounded by a core and mold halves. If the core so used is formed, at its tip, with a rib-shaped concavo-convex pattern in the prior art, the flow of injected material will be disturbed to provide uneven wall thickness in the resulting parison, leading to an irregularity in temperature. Accordingly, such a technique could not be applied to the hot parison technique.

When it is particularly desired to produce a PET bottle having its very complicated configuration, a closed-end parison itself used therefor frequently has a complicated configuration. If such a closed-end parison is to be injection molded, it is required to control the injection molding procedure such that the flow of PET in the mold cavity will not be disturbed as much as possible, without creation of irregularity in temperature. It is not absolutely acceptable to provide a rib-shaped concavo-convex pattern on the tip of the core used to form the mold cavity.

SUMMARY OF THE INVENTION

It is therefore an object of the present invention to provide an injection/stretch/blow molding process wherein a hollow container can be simply and easily formed with the bottom thereof strengthened by a concavo-convex pattern and preferably a rib-shaped pattern.

To this end, the present invention provides a process comprising the steps of:

injection molding a closed-end parison;

adjusting the temperature in said closed-end parison by heating or cooling the necessary part of said closed-end parison within a temperature adjusting pot in temperature adjusting means; and blowing said closed-end parison adjusted with respect to its temperature into a hollow container having a desired configuration;

said temperature adjusting step using at least either of said pot or a temperature adjusting core in the temperature adjusting means so as to apply a pre-treatment to the bottom portion of said hot closed-end parison for obtaining a predetermined concavo-convex pattern in the bottom portion of a hollow container formed in the subsequent blowing step.

The term "closed-end parison" used herein is intended to include some preform which can be molded in accordance with the principle of the present invention, other than the closed-end parison.

As is well-known, the closed-end parison has a relatively high internal temperature immediately after injection molding. It is also well-known that the average resin temperature across the wall of a parison immediately after injection molding is higher at the thicker wall portion than at the thinner wall portion of the parison.

If such a closed-end parison is blown as it is, therefore, the wall portion thereof being higher in internal temperature will be more stretched while the other wall portion of the parison being lower in internal temperature will be less drawn.

Such a process of blowing a closed-end parison having an internal temperature is called "hot parison technique". The hot parison technique frequently performs an adjustment of temperature in which various parts of a hot closed-end parison are locally heated or cooled by a temperature adjusting pot in a temperature adjusting device so as to provide a desired thickness throughout a hollow molded container.

In such an adjustment of temperature, the closed-end parison is normally received within a temperature adjusting Pot. A temperature adjusting core is then inserted into the parison through the open end thereof.

The process of the present invention is characterized by the temperature adjusting step performed prior to the blowing step, wherein the bottom of a hot closed-end parison is previously treated to provide a hollow blown container having its bottom portion formed with a desired concavo-convex pattern, preferably a rib-shaped strengthening pattern.

In order to perform such a pre-treatment, for example, at least one of the temperature adjusting pot and core is previously formed with a concavo-convex pattern which is to be formed in the bottom of a hot parison prior to the blowing step. The temperature adjusting core or pot is located surrounding the bottom portion of the hot closed-end parison and then compressed against that bottom portion. Since a series of steps are performed against the hot closed-end parison while the internal temperature thereof remains at its relatively high level, the compression of the temperature adjusting core or pot against the bottom portion of the parison can simply and easily transfer the desired concavo-convex pattern from the core or pot to the bottom portion of the hot closed-end parison.

The hot closed-end parison thus pre-treated is then fed to the subsequent blowing step wherein it will be formed into a hollow container having its bottom portion formed with a concavo-convex strengthening pattern and particular a rib-shaped strengthening pattern.

Alternatively, any one of the temperature adjusting pot or core may have a "temperature control pattern" portion which can provide finely different temperature levels to the bottom of a hot closed-end parison, compatible with the concavo-convex strengthening pattern. Such a pot or core can be similarly applied to compress it against the hot closed-end parison under a predetermined Pressure. Thus, the bottom portion of the hot closed-end parison will be pre-treated with differential temperature corresponding to the temperature control pattern. The pre-treated parison is then fed to the blowing step wherein it is formed into a hollow container having its bottom patterned with the desired strengthening ribs.

In such a manner, the present invention provides a process which can simply and easily form a hollow container having its bottom portion strengthened by a concavo-convex or rib-shaped pattern without reduction of the productivity.

BRIEF DESCRIPTION OF THE DRAWINGS

FIG. 1 is a fragmentary view showing, in an enlarged scale, a temperature adjusting device which is one of the primary parts of the present invention.

FIG. 2 illustrates an injection/stretch/blow molding system taking the hot parison technique.

FIG. 3 is a schematic cross-section of a parison formed by the injection molding device in the first embodiment.

FIG. 4 is a schematic cross-section of the temperature adjusting device used in the first embodiment.

FIG. 5 is a plan view showing a concavo-convex pattern on the tip of the temperature adjusting core shown in FIGS. 1 and 4.

FIG. 6 is a cross-sectional view of the bottom portion of a parison, onto which the concavo-convex pattern shown in FIG. 5 is transferred from the temperature adjusting core.

FIG. 7 schematically illustrates the blow molding device used in the system of the first embodiment.

FIGS. 8 through 10 schematically illustrate the bottom of a hollow container formed by the use of the first embodiment system, FIG. 8 being a plan view of the bottom;

FIG. 9 being a cross-sectional view taken along a line A—A' in FIG. 8; and

FIG. 10 being a cross-sectional view taken along a line B—B' in FIG. 8.

FIG. 11 illustrates a part of the temperature adjusting device which is an essential part in the present invention.

FIG. 12 is a plan view of a temperature control pattern portion on the tip of the temperature adjusting pot shown in FIG. 11.

FIG. 13 illustrates the distribution of temperature in the bottom of a parison, which is provided by the use of the temperature control pattern shown in FIG. 12.

DETAILED DESCRIPTION OF THE PREFERRED EMBODIMENTS

The present invention will now be described by way of example in conjunction with the drawings.

First Embodiment

Figure 2:
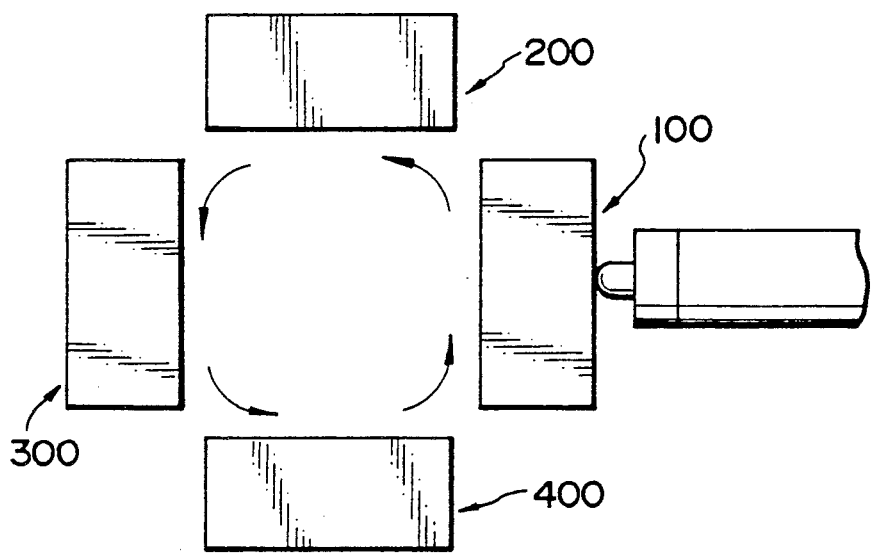

Referring first to FIG. 2, there is shown a preferred form of an injection/draw/blow molding apparatus relating to the present invention. The apparatus generally comprises an injection molding device 100 for injection molding a hot closed-end parison; a temperature adjusting device 200 for adjusting the temperature of the hot closed-end parison; a blowing device 300 for blow molding a hollow container from the hot closed-end parison after it has been adjusted in temperature; and a separating device 400 for cutting the hollow container off the blow molding device after the hollow container has been blown therein.

Figure 3:
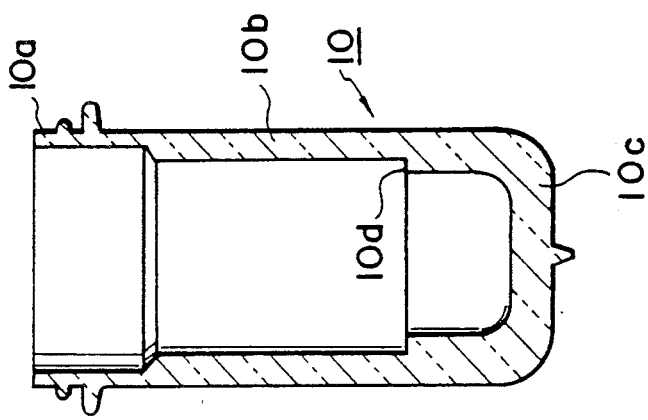

The injection molding device 100 injection molds a closed-end parison 10 as shown in FIG. 3. The closed-end parison 10 includes a threaded neck portion 10a, a body portion 10b extending longitudinally from the neck portion 10a and a bottom portion 10c which will form the bottom of a hollow container after blown. An internal step 10d is formed in the connection between the body portion 10b and the bottom portion 10c.

The bottom 10c is shown to be of a cup-shaped configuration including a bottom face region and a side region, but may be formed to have a flat configuration. Since the internal step 10d is formed between the cup-shaped bottom portion 10c and the body portion 10b, the internal diameter of the bottom portion 10c will be slightly smaller than that of the body portion 10b.

After being injection molded, the closed-end parison 10 is directly supplied to the temperature adjusting device 200.

Figure 4:
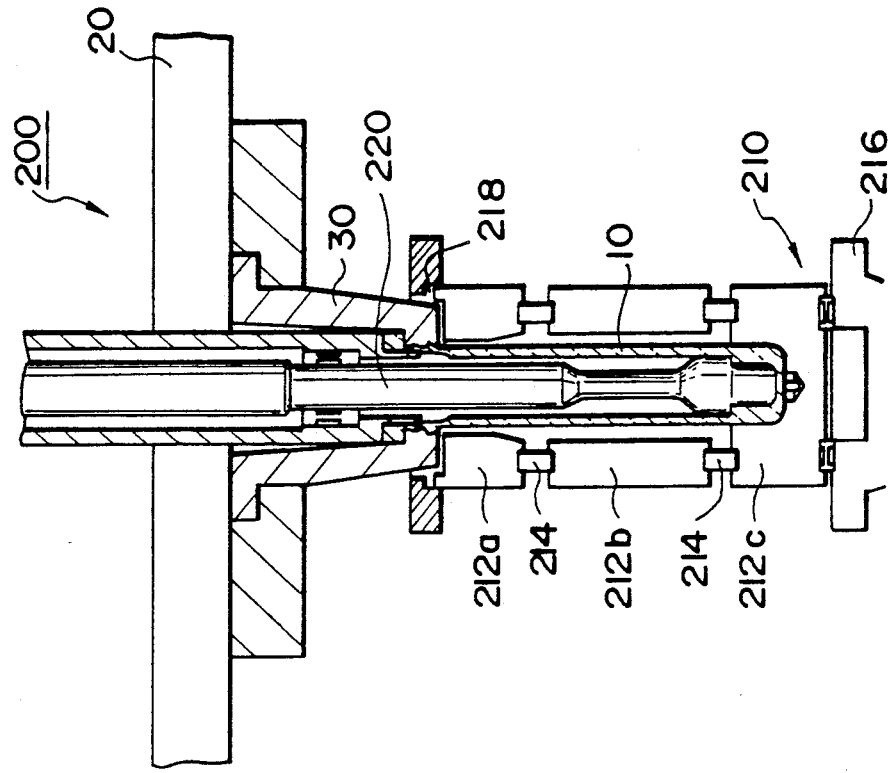

FIG. 4 shows the temperature adjusting device 200. Normally, the hot closed-end parison 10 is held, at its neck portion 10a, by a neck mold section 30 on a rotary disc 20. As the rotary disc 20 is rotated, the parison 10 is fed to the subsequent step while being held by the neck mold section 30.

The temperature adjusting device 200 comprises a temperature adjusting pot 210 for heating or cooling the closed-end parison 10 at the outer periphery thereof and a temperature adjusting core 220 for heating or cooling the parison 10 from the interior thereof.

The temperature adjusting pot 210 includes an elevator means 216. The temperature adjusting core also includes an elevator means (not shown). Thus, the pot and core may be normally placed at their lower and upper retracted positions, respectively. When the parison 10 is moved to a predetermined position by the rotary disc 20, the temperature adjusting pot 210 is raised, by its elevator means 216, to a position wherein a center ring 218 in the opened tip of the pot 210 engages the end of the neck mold section 210.

The temperature adjusting pot 210 also includes a plurality of temperature adjusting blocks 212a, 212b for covering the barrel portion of the parison 10 and a temperature adjusting block 212c for surrounding the outer periphery of the bottom portion 10c of the parison 10. An insulator 214 is provided to connect the adjacent blocks with each other. It is usually required that the body portion 10b of the parison 10 is sufficiently drawn on blowing. In the temperature adjusting step, therefore, the body portion of the parison must be heated up to a desired temperature. On the contrary, the bottom portion 10c of the parison has a variable temperature depending on the wall thickness of that bottom portion to be formed. If the bottom portion of the parison is to have a thicker wall, it must be cooled up to some extent of temperature. If it is desired to provide a smaller wall thickness in the bottom portion, the parison should be heated up to a predetermined level of temperature at its bottom. In the first embodiment, it is assumed that the bottom portion 10c of the parison 10 is cooled down to a predetermined temperature in order to provide a thicker wall in the bottom portion 10c.

For such a purpose, the plurality of temperature adjusting blocks 212a and 212b are utilized as heating blocks surrounding the barrel portion 10b of the parison 10 while the temperature adjusting block 212c covering the bottom portion 10c is used as cooling block. The temperature adjusting pot 210 is organized such that when the center ring 218 on the opened end of the pot is engaged by the neck mold section 30, the cooling block 212c is sealingly pressed against the bottom portion 10c of the parison 10 under a predetermined pressure.

The temperature adjusting core 220 is lowered into the interior of the parison 10 from above the rotary disc 20 past the interior of the neck mold section 30. The core 220 is stopped at a position in which the tip thereof is sealingly pressed against the inner wall of the bottom portion 10c.

The temperature adjusting core 220 includes a heating and cooling mechanism (not shown) which is adapted to heat or cool the barrel and bottom portions 10b, 10c of the parison 10. In the illustrated embodiment, the bottom portion 10c is being cooled.

Conventionally, the hot closed-end parison 10 is fed to and molded at the blowing step into a hollow container after the parison has been adjusted in temperature by the use of the temperature adjusting pot and core 210, 220. Additionally, the present invention is characterized by that it utilizes the temperature adjusting pot and core 210, 220 which can also press the bottom portion 10c of the parison 10 from the opposite sides thereof under a predetermined pressure. In such a manner, a pre-treating step can be made to the bottom portion 10c of the parison to provide a desired concavo-convex pattern at the bottom portion of the hollow container during the blow molding step.

In order to perform such a pre-treatment, at least one of the tip portion of the temperature adjusting core 220 and the surface of the cooling block 212c may be formed with a concavo-convex pattern used for making the pre-treatment on the bottom portion of the parison. When the bottom portion 10c of the parison 10 is clamped between the temperature adjusting core 220 and the cooling block 212c under a predetermined pressure, the aforementioned concavo-convex pattern will be transferred therefrom to the bottom portion 10c of the parison 10. As a result, the bottom portion 10c will have different wall thickness at various parts.

Particularly, if the hot parison 10 maintains sufficient heat at the interior of the wall thereof, the concavo-convex pattern can be simply and easily transferred from the temperature adjusting core 220 and/or the cooling block 212c to the bottom portion 10c when the latter is clamped between the core 220 and the cooling block 212c under a predetermined pressure. The parison 10 thus patterned is then fed to the subsequent blowing step wherein a hollow container having its bottom portion with the concavo-convex pattern can be simply and easily formed.

Figure 1:
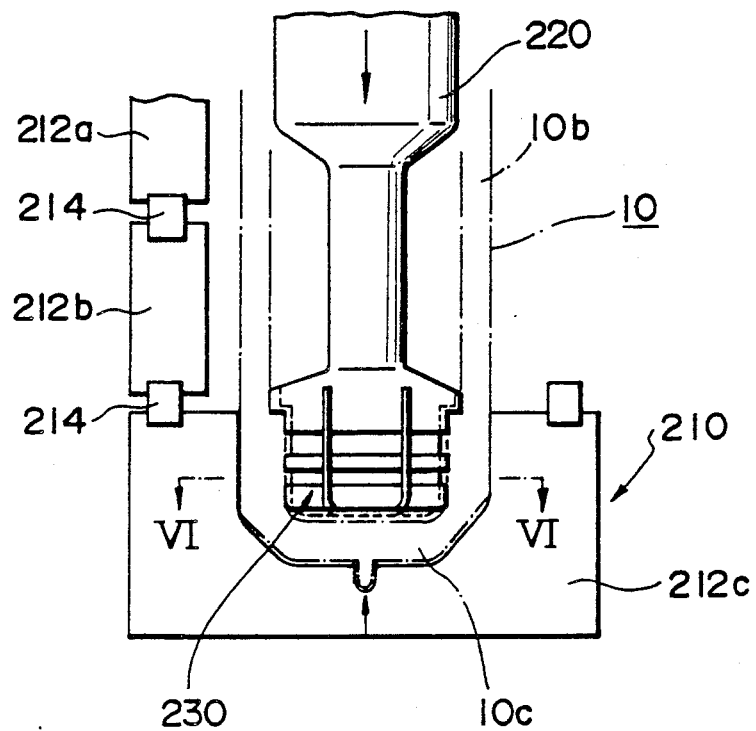
FIGS. 1 through 10 illustrate a first embodiment of the present invention.

FIG. 1 shows a preferred embodiment of the present invention in which the tip of the temperature adjusting core 220 includes a concavo-convex pattern 230 formed therein, the concavo-convex pattern being in turn transferred therefrom to the inner wall of the bottom portion 10c.

Figure 5:
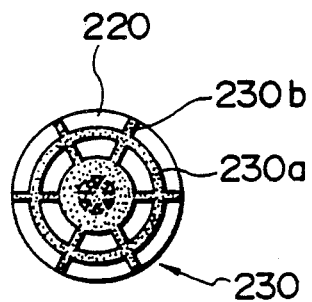

In this embodiment, the tip of the temperature adjusting core 220 has an external diameter slightly larger than the internal diameter of the bottom portion 10c of the parison 10. The concavo-convex pattern 230 on the tip of the core 220 consists of a plurality of concentric ring-like groove portions 230a spaced away from each other a predetermined distance and a plurality of radial groove portions 230b extending radially from the tip to the outer periphery, these radial grooves also functioning as air vents, as shown in FIG. 5.

The procedure of clamping the bottom portion 10c of the parison 10 between the temperature adjusting core 220 and the cooling block 212c may be optionally set, if necessary. In this embodiment, the temperature adjusting core 220 is inserted into the interior of the parison until the tip of the core 220 is brought into contact with the inner wall of the bottom portion 10c of the parison. In such a state, the elevator means 216 is initiated to move the cooling block 212c upwardly by a distance equal to about 0.5 mm to compress the bottom portion 10c so that the concavo-convex pattern 230 will be transferred from the cooling block to the inner wall of the bottom portion 10c.

Since the external diameter of the tip of the temperature adjusting core 220 on which the concavo-convex pattern 230 is formed is slightly larger than the internal diameter of the bottom portion 10c of the parison 10 in this embodiment, the tip of the temperature adjusting core 220 will be press fitted into the interior of the bottom portion 10c. Thus, the concavo-convex pattern 230 can be well transferred from the tip of the temperature adjusting core 220 to both the bottom and side face regions of the bottom portion 10c through the entire internal surfaces thereof.

Figure 6:
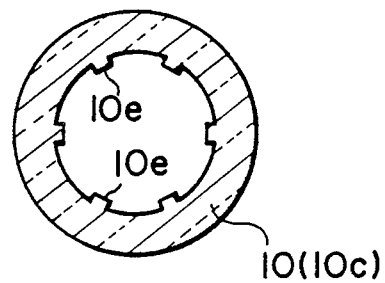

FIG. 6 is a cross-sectional view of the bottom portion 10c in FIG. 1, taken along a line VI—VI therein. As seen from FIG. 6, a plurality of ribs 10e are formed on the inner wall of the bottom portion 10c by the ring-shaped and radial groove portions 230a and 230b in the concavo-convex pattern 230.

As the transfer and temperature adjustment for the parison 10 is completed, the temperature adjusting core and pot 220, 210 are then retracted upward and downward, respectively. Thereafter, the rotary disc 20 is rotated to convey the parison 10 to the blowing device 300.

Figure 7:
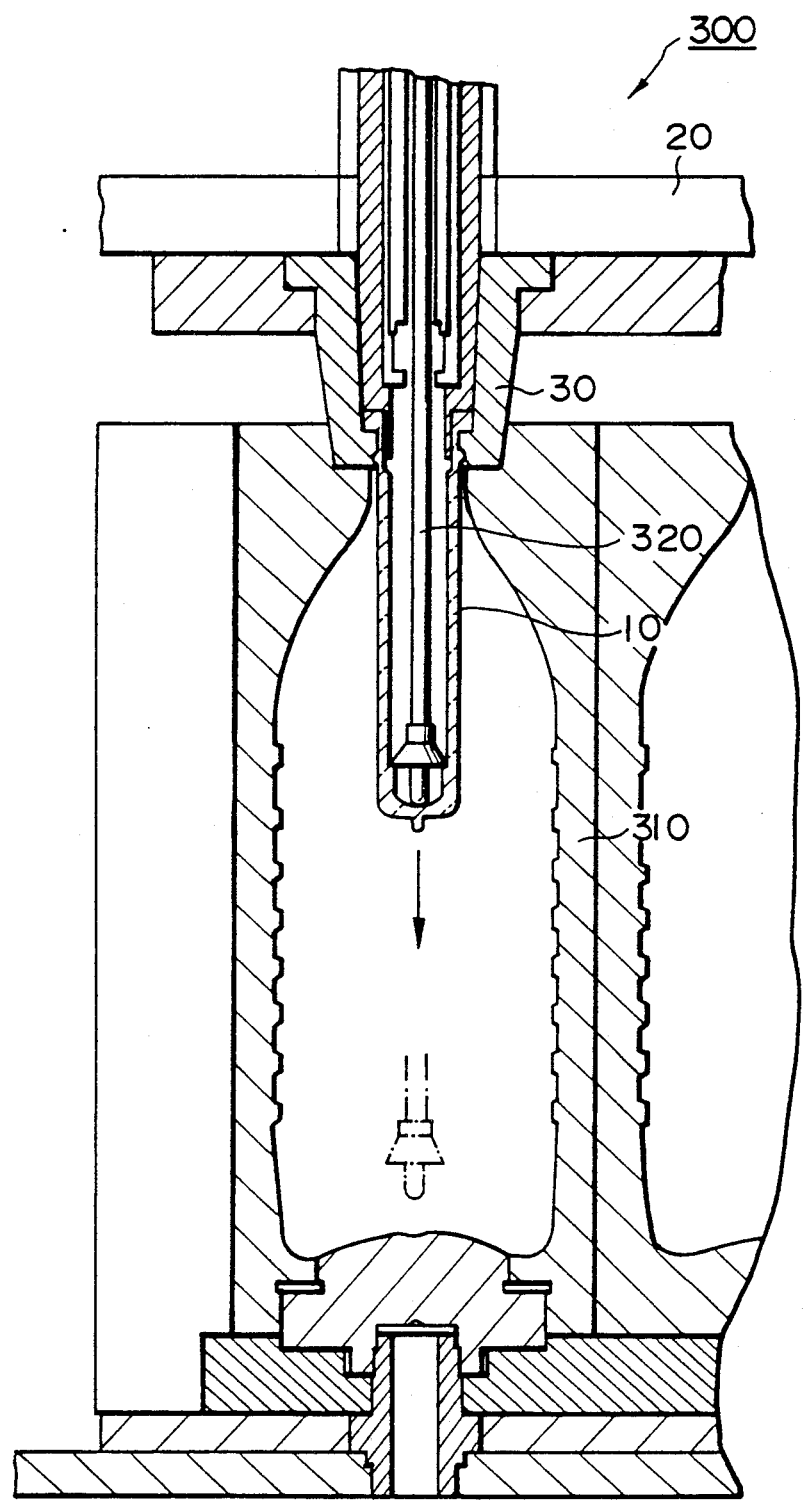

The blowing device 300 is shown in FIG. 7, which comprises a split mold 310 having cavity faces adapted to define the configuration of a finished product and a stretching rod 320 for axially stretching the parison 10. By using the well-known technique, the blowing device 300 can orient or strech and blow mold the parison 10 into a hollow container.

Since the bottom portion 10c of the parison 10 is blown in accordance with the transferred concavo-convex pattern, the bottom portion of a hollow container so formed will have a concavo-convex pattern corresponding to the aforementioned concavo-convex pattern 230.

Figure 8:
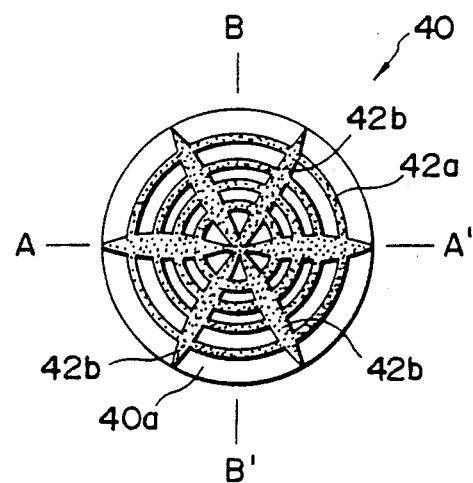
Figure 9:
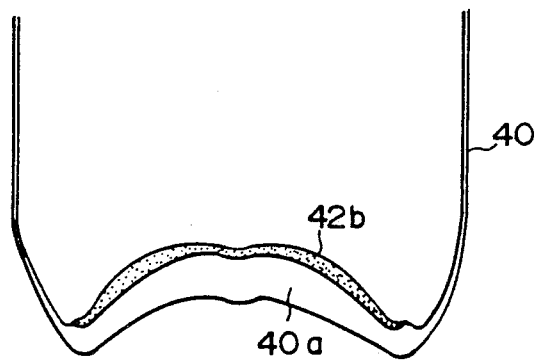
Figure 10:
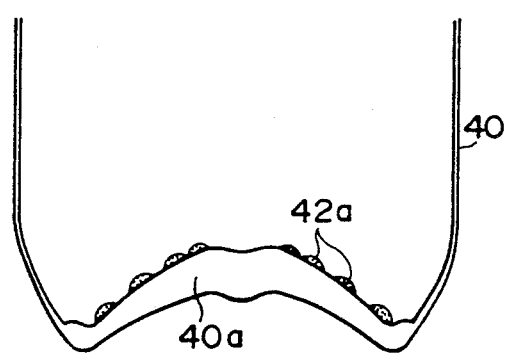

FIGS. 8 to 10 show part of the hollow container 40 blown in such a manner. FIG. 8 shows the inner wall of the bottom portion 40a of the hollow container 40; FIG. 9 is a schematic cross-section of the bottom portion 40a taken along a line A—A'; and FIG. 10 is a schematic cross-section of the bottom portion 40a taken along a line B—B'.

As can seen from FIGS. 8 to 10, the bottom portion 40a of the hollow container 40, which has been blow molded, is formed with a plurality of concentric ring-like strengthening ribs 42a and a plurality of radial strengthening ribs 42b, which ribs 42a and 42b correspond to the respective groove portions 230a and 230b in the concavo-convex pattern 230.

In such a manner, the present invention can simply and easily form the strengthening ribs 42a and 42b in the desired pattern on the bottom portion 40a of the hollow container 40 only by making a predetermined pre-treating step onto the bottom portion 10c of the parison 10 during the temperature adjusting step.

In this embodiment, particularly, the hollow container 40 can be molded with sufficient strength in its bottom portion 40a and without disturbing the appearance of the hollow container, since these ribs 42a and 42b can be formed on the inner wall of the bottom portion 40a of the hollow container 40.

Second Embodiment

Figure 11:
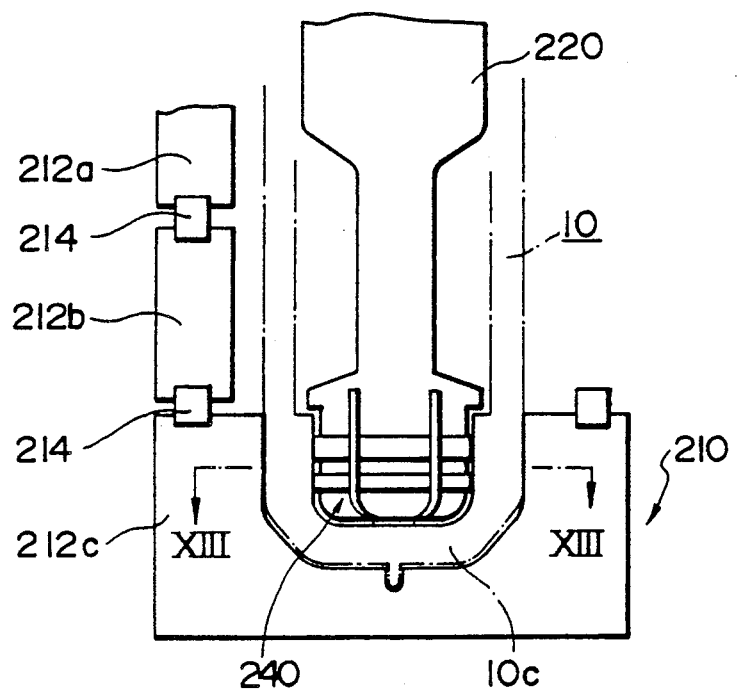
FIGS. 11 through 13 illustrate a second preferred embodiment of the present invention.
Figure 12:
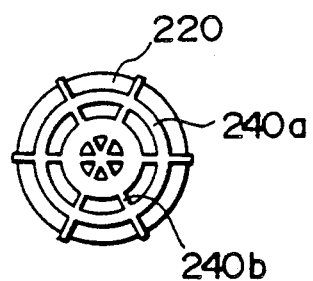
Figure 13:
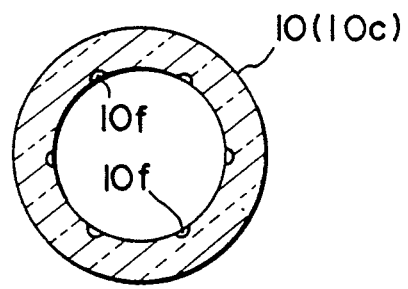

FIG. 11 to 13 show a second preferred embodiment of a temperature adjusting device 200 in the injection stretch blow molding apparatus of the present invention. Parts similar to those of the first embodiment are denoted by similar reference numerals.

Although the first embodiment has been described as to the concavo-convex pattern 230 on the tip of the temperature adjusting core 220, which pattern is to be transferred therefrom to the bottom portion of the hollow product, the second embodiment utilizes a temperature control pattern 240 formed on the tip of the temperature adjusting core 220 so as to provide a distribution of differential temperature having a pattern corresponding to the aforementioned concavo-convex pattern to be transferred from the tip of the core 220 to the parison.

This temperature control pattern 240 consists of a plurality of concentrically spaced convex ring portions 240a about the central axis of the core tip and a plurality of radially extending convex portions 240b from the central axis of the core tip to the peripheral edge of the same.

The temperature adjusting core 220 is used as cooling core. On operation, the temperature control pattern 240 on the core tip is pressed against the inner wall of the bottom portion 10c of the parison 10 to cool it through the convex portions 240a and 240b therein.

FIG. 13 shows a cross-section of the parison 10, taken along a line VIII—VIII in FIG. 11. In this figure, reference numeral 10f denotes parts of the parison 10 which are cooled by the respective convex portions 240a and 240b in the temperature control pattern 240.

After the inner bottom wall of the parison 10 has been cooled only at portions corresponding to the temperature adjusting pattern 240, the parison 10 is fed to and molded at the blow molding step into a hollow container 40 having its bottom portion 40a which is formed with ribs 42a and 42b corresponding to the convex portions 240a and 240b in the temperature control pattern 240, respectively, as shown in FIGS. 8 through 10.

This is because when the hollow container is formed in the blowing step, the wall thickness thereof can be highly influenced by differential temperature provided to the parison 10 in the temperature adjusting step since the hot parison is blow molded utilizing the potential heat in the injection molded parison. More particularly, the parts 10f cooled through the convex portions 240a and 240b in the temperature control pattern 240 are less stretched during the blow molding step. Thus, the ring-like and radial strengthening ribs 42a and 42b will be formed in the bottom portion 40a of the hollow container 40 during the blow molding step.

Although the second embodiment has been described as to the temperature control pattern 240 having the convex portions 240a and 240b made of the same material as that of the temperature adjusting core, the present invention is not limited to such a structure and may be applied to a temperature control pattern made of any other material different from that of the core in thermal conductivity.

Although the second embodiment has been described at to the temperature control pattern 240 constituted of the convex portions 240a and 240b, a planar temperature control pattern may be obtained when the convex and concave portions in the pattern are respectively made of materials different from each other in thermal conductivity.

The present invention is not limited to the embodiments illustrated and described herein and may be applied in various modified and changed forms without departing the scope and spirit of the invention.

For example, the concavo-convex pattern 230 may be combined with the temperature control pattern 240 in the tip of the temperature adjusting core 220. In such a case, the groove portions 230a and 230b in the concavo-convex pattern 230 may be formed of any suitable material having its thermal conductivity higher than that of the convex portions in the same pattern. Such a construction can more effectively cool the convex rib-like portions 10e transferred to the bottom portion 10c of the parison 10 as shown in FIG. 6. On the sequential blow molding step, these cooled convex portions 10e are less stretched. As a result, the concavo-convex pattern consisting of the ribs 42a and 42b can be more effectively formed in the bottom portion 40a of the hollow container 40 when being blow molded.

Although the embodiments have been described as to the concavo-convex pattern formed in the inner wall of the bottom portion 40a of the hollow container 40, the present invention is not limited to such an arrangement and may be similarly applied to provide concavo-convex patterns formed in the bottom portion 40a only at the outer wall or at both the inner and outer walls. If a concavo-convex pattern is to be formed in the outer wall of the bottom portion 40a, the concavo-convex pattern 230 or the temperature control pattern 240 may be formed on the surface of the cooling block 212c of the temperature adjusting pot 210 in a manner similar to that of the described embodiments.

Although the embodiments have been described as to the rib-shaped pattern formed on the bottom portion 40a of the hollow container 40, any other pattern may be similarly used in accordance with the present invention, if desired.

As will be apparent from the foregoing, the present invention can mass-produce hollow containers having their bottom portions formed with the desired concavo-convex pattern simply and inexpensively by using at least one of the temperature adjusting pot and core and performing a pre-treatment for providing a desired concavo-convex pattern to the bottom portion of a hollow container to be blown, during the temperature adjusting step wherein a hot closed-end parison is adjusted in internal temperature.

I claim:

1. A process comprising the steps of:
   injection molding a hot closed-end parison;
   adjusting the temperature of said hot closed-end parison by heating or cooling said hot closed-end parison in at least one predetermined location within a temperature adjusting pot in a temperature adjusting device; and
   blow molding the closed-end parison into a hollow container having a predetermined configuration after said parison has been adjusted in temperature;
   said temperature adjusting step using at least either of the temperature adjusting pot or a temperature adjusting core in said temperature adjusting device so as to apply pressure to said at least one predetermined location of said hot closed-end parison by clamping and compressing said parison between said temperature adjusting pot and core to create a differential wall thickness in said at least one predetermined location for obtaining a predetermined concavo-convex pattern provided to a corresponding portion of said hollow container formed at said blow molding step.

2. A process as defined in claim 1 wherein said temperature adjusting step performs:
   a compression for obtaining a concavo-convex rib-like pattern on the bottom portion of the hollow container formed int he subsequent blowing step.

3. A process as defined in claim 1 further comprising:
   before said injection molding step, forming a concavo-convex pattern on at least one of said temperature adjusting pot and core int eh temperature adjusting device; and wherein said temperature adjusting step further comprises transferring said concavo-convex pattern to the bottom portion of said hot closed-end parison by clamping and compressing said parison between said temperature adjusting core and pot under a predetermined pressure.

4. A process as defined in claim 3 wherein said concavo-convex pattern:
   is formed on the temperature adjusting core and transferred from said temperature adjusting core to the inner wall of the bottom portion of said hot closed-end parison.

5. A process as defined in claim 4 wherein said injection molding step further includes the step of:
   forming the bottom portion of said hot closed-end parison into a cup-shaped configuration, said hot closed-end parison having a body portion, the internal diameter of which is larger than that of the cup-shaped bottom portion and wherein said temperature adjusting step further includes the step of:
   forming the tip of said temperature adjusting core with said concavo-convex pattern formed therein to have an external diameter slightly larger than the internal diameter of said hot closed-end parison at its bottom portion, the tip of said temperature adjusting core being press fitted into the interior of the cup-shaped bottom portion of said hot closed-end parison, such that said concavo-convex pattern is transferred from said temperature adjusting core to the inner wall of the cup-shaped bottom portion of said hot closed-end parison.

6. A process as defined in claim 3 wherein said concavo-convex pattern comprises:
   a plurality of concentric ring-shaped groove portions spaced away from each other a predetermined distance;
   and a plurality of radial groove portions extending radially from the central axis of said pattern, said radial groove portions also functioning as air vents.

7. A process as defined in claim 5 wherein said concavo-convex pattern comprises:
   a plurality of concentric ring-shaped groove portions spaced away from each other a predetermined distance and a plurality of radial groove portions extending radially from the central axis of said pattern, said radial groove portions also functioning as air vents.

8. A process as defined in claim 3 wherein said temperature adjusting step further includes the steps of:
   clamping the bottom portion of said hot closed-end parison between the temperature adjusting core and pot; and
   thereafter moving at least one of said temperature adjusting core and pot toward the other by a predetermined amount to transfer the concavo-convex pattern to the bottom of said hot closed-end parison.

9. A process as defined in claim 7 wherein said temperature adjusting step further includes the steps of:
   clamping the bottom portion of said hot closed-end , parison between the temperature adjusting core and pot; and
   thereafter moving at least one of said temperature adjusting core and pot toward the other by a predetermined amount to transfer the concavo-convex pattern to the bottom of said hot closed-end parison.

10. A process comprising the steps of:
    forming a concavo-convex pattern on at least one of a temperature adjusting pot and core in a temperature adjusting device;
    injection molding a hot closed-end parison;
    adjusting the temperature of said hot closed-end parison by heating or cooling said hot closed-end parison in at least one predetermined location within the temperature adjusting pot in the temperature adjusting device;

said temperature adjusting step further comprising:

clamping the bottom portion of said hot closed-end parison between the temperature adjusting core and pot and thereafter moving at least one of said temperature adjusting core and pot toward the other by a predetermined amount, said concavo-convex pattern being transferred therefrom to the bottom portion of said hot closed-end parison by clamping and compressing said parison between said temperature adjusting core and pot under a predetermined pressure thereby creating a differential wall thickness in the bottom portion of said hot closed end parison; and blow molding the closed-end parison into a hollow container having a predetermined configuration after said parison has been adjusted in temperature thereby obtaining a predetermined concavo-convex pattern on a portion of said hollow container which corresponds to said concavo-convex pattern transferred to said hot closed-end parison.

11. A process comprising the steps of:

injection molding a hot closed-end parison thereby forming a bottom portion of said hot closed-end parison into a cup-shaped configuration having an inner wall, said hot closed-end parison having a body portion, the internal diameter of which is larger than that of the cup-shaped bottom portion;

adjusting the temperature of said hot closed-end parison by heating or cooling said hot closed-end parison in at least one predetermined location within a temperature adjusting pot in a temperature adjusting device; and blow molding the closed-end parison into a hollow container having a predetermined configuration after said parison has been adjusted in temperature;

said temperature adjusting step using a temperature adjusting core having a tip with a concavo-convex pattern formed thereon in said temperature adjusting device to transfer the concavo-convex pattern from said temperature adjusting core to the inner wall of the bottom portion of said hot closed-end parison for obtaining a predetermined concavo-convex pattern provided to the bottom portion of a hollow container formed at the subsequent blowing step, wherein the tip of said temperature adjusting core is formed with said concavo-convex pattern formed therein having raised portions with an external diameter slightly larger than the internal diameter of said hot closed-end parison at its bottom portion, the tip of said temperature adjusting core being press fitted into the interior of the cup-shaped bottom portion of said hot closed-end parison, such that said parison is clamped and compressed between said temperature adjusting pot an core under a predetermined pressure, for said transfer of said concavo-convex pattern to the inner wall of said hot closed-end parison to create a differential wall thickness in said parison.

* * * * *